US005080257A

United States Patent [19]

Carnisio

[11] Patent Number: 5,080,257

[45] Date of Patent: Jan. 14, 1992

[54] APPARATUS FOR AUTOMATICALLY DISPENSING CONES AND THE LIKE, DESTINED TO CONTAIN ICE CREAM

[76] Inventor: Umberto Carnisio, Via XXV Aprile, 7 - Galliate (Novara), Italy

[21] Appl. No.: 464,005

[22] Filed: Jan. 12, 1990

[30] Foreign Application Priority Data

Jan. 16, 1989 [IT] Italy ............................. 19097 A/89

[51] Int. Cl.$^5$ ............................................ B65G 59/00

[52] U.S. Cl. .................................. 221/113; 221/121; 221/122; 221/133; 221/195; 221/172

[58] Field of Search ............... 221/113, 112, 119, 121, 221/122, 133, 191, 194, 195, 4, 6, 197, 172; 312/97.1; 141/174, 173

[56] References Cited

U.S. PATENT DOCUMENTS 1,159,245 11/1915 Millard .............................. 221/113
4,136,800 1/1979 Christner et al. ............... 221/113 X
4,579,250 4/1986 Fuss et al. ....................... 221/197 X
4,782,979 11/1988 Smith et al. ............................ 221/6
4,807,780 2/1989 Parsons et al. ...................... 221/113

*Primary Examiner*—David H. Bollinger
*Attorney, Agent, or Firm*—Charles A. Brown

[57] ABSTRACT

An apparatus for automatically dispensing cones and the like, contained in piled-up condition and in upside-down position inside a plurality of container tubes. A carrousel revolves stepwise over a plane above which the cones rest and slide. A pair of stationary circular guides is positioned between the carrousel and the resting/sliding plane. A first cone of each cone stack is fed and made advance. The pair of guides are provided with respective inclined planes acting on the peripheral edges of the second cone of each cone stack to separate the first cone from the overhanging cone stack while the first cone falls by gravity into a dispensing station.

5 Claims, 3 Drawing Sheets

Figure 1:
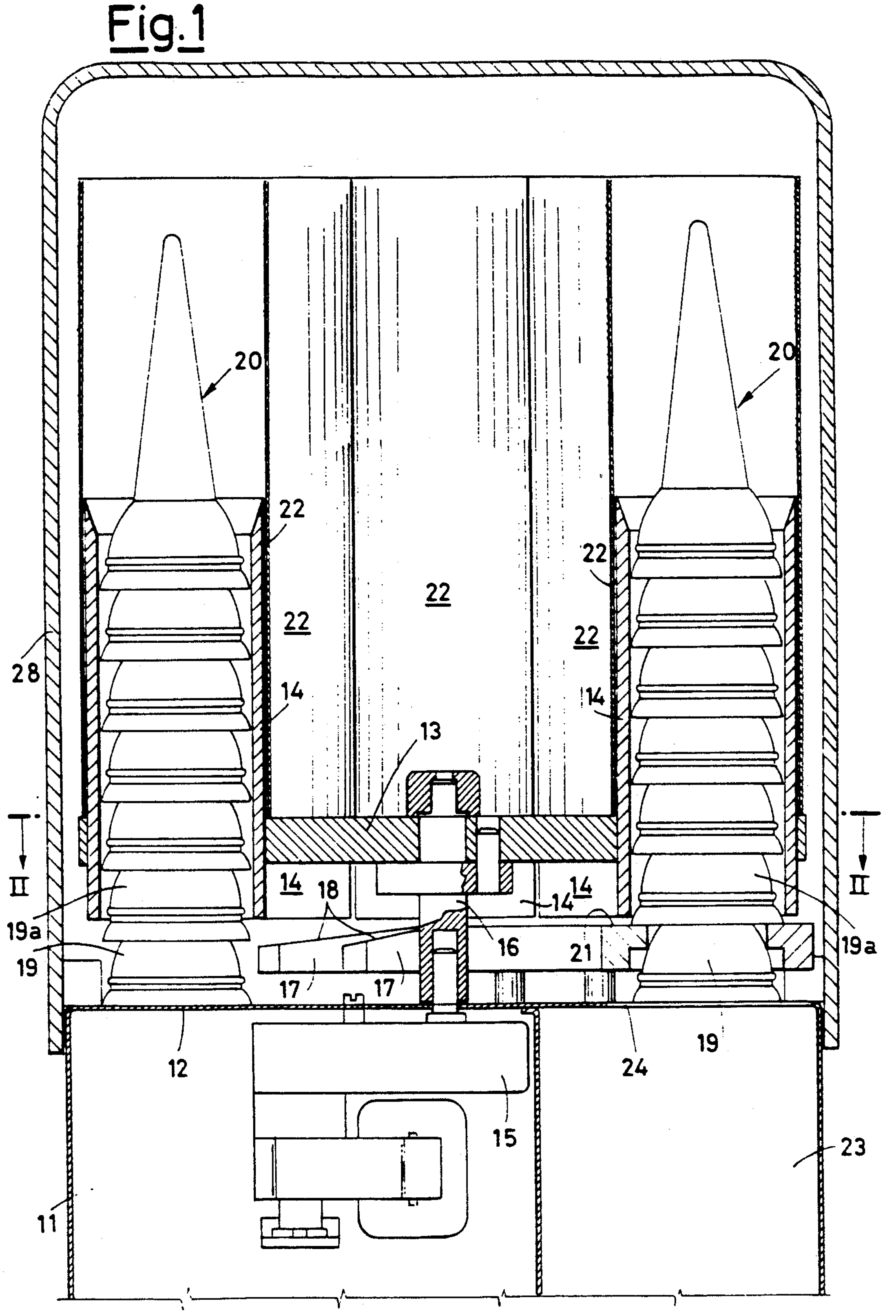

APPARATUS FOR AUTOMATICALLY DISPENSING CONES AND THE LIKE, DESTINED TO CONTAIN ICE CREAM

The present invention relates to an improved apparatus capable of automatically dispensing cones and the like, which are destined to contain ice cream and/or whipped cream. The cones are drawn, e.g., from a coin- or token-operated dispenser with which the cone dispenser in question is associated.

Those skilled in the art are very well aware of the technical problems to be solved in the design of the automatic cone dispensers. Often the irregular shape of cones after being baked and breakages caused by their subsequent handling tend to get cones jammed inside each other, when they are piled up. So, that removing them from the cone stack without causing undesired breakages may become difficult.

For that purpose, automatic dispensers have been proposed in the past, which display a very complex, hence expensive, structure, and which are badly integrated, also from an aesthetical viewpoint, with the ice cream machine. In addition to the above, they, precisely owing to their complexity, are difficult to clean. A cleaning thereof should be carried out often, due to self-explanatory hygienic reasons.

The general purpose of the present invention if to overcoming the above set forth problems, by providing an automatic dispenser which is very simple from a structural viewpoint, is relatively not very expensive to be manufactured, is reliable in operation, is extremely simply and rapidly cleaned and serviced, and which is finally suitable for being easily integrated, also from an aesthetical viewpoint, which the ice cream machine with which the same dispenser is associated.

The above purpose is achieved, in accordance with the present invention, by an apparatus for automatically dispensing cones and the like. The apparatus comprises a plurality of tubes. Each one of the tubes contains a plurality of the cones, in upside-down position and stuck inside each other. Motor means for sequentially moving the tubes in correspondence of a dispenser station which dispenses one cone at a time, and gripping means capable of separating a first cone only, i.e., the cone to be dispensed, from the overhanging cone stack are provided. The motor means comprise a carrousel revolving stepwise over a plane on which the cone stacks rest and slide. The gripping means comprise a pair of stationary circular guides positioned between the carrousel and the plane, between which guides the first cone of each one of the cone stacks is fed and advanced. A pair of guides is provided, at their cone inlet end, with respective inclined planes acting on the peripheral edges of the second cone of the cone stacks in such a way as to separate the first cone from the overhanging cone stack. The cone stack comes hence to be supported by the same guides, while the first cone rests on the underlying plane which supports it until it falls by gravity into the dispensing station which is positioned under the plane.

Figure 2:
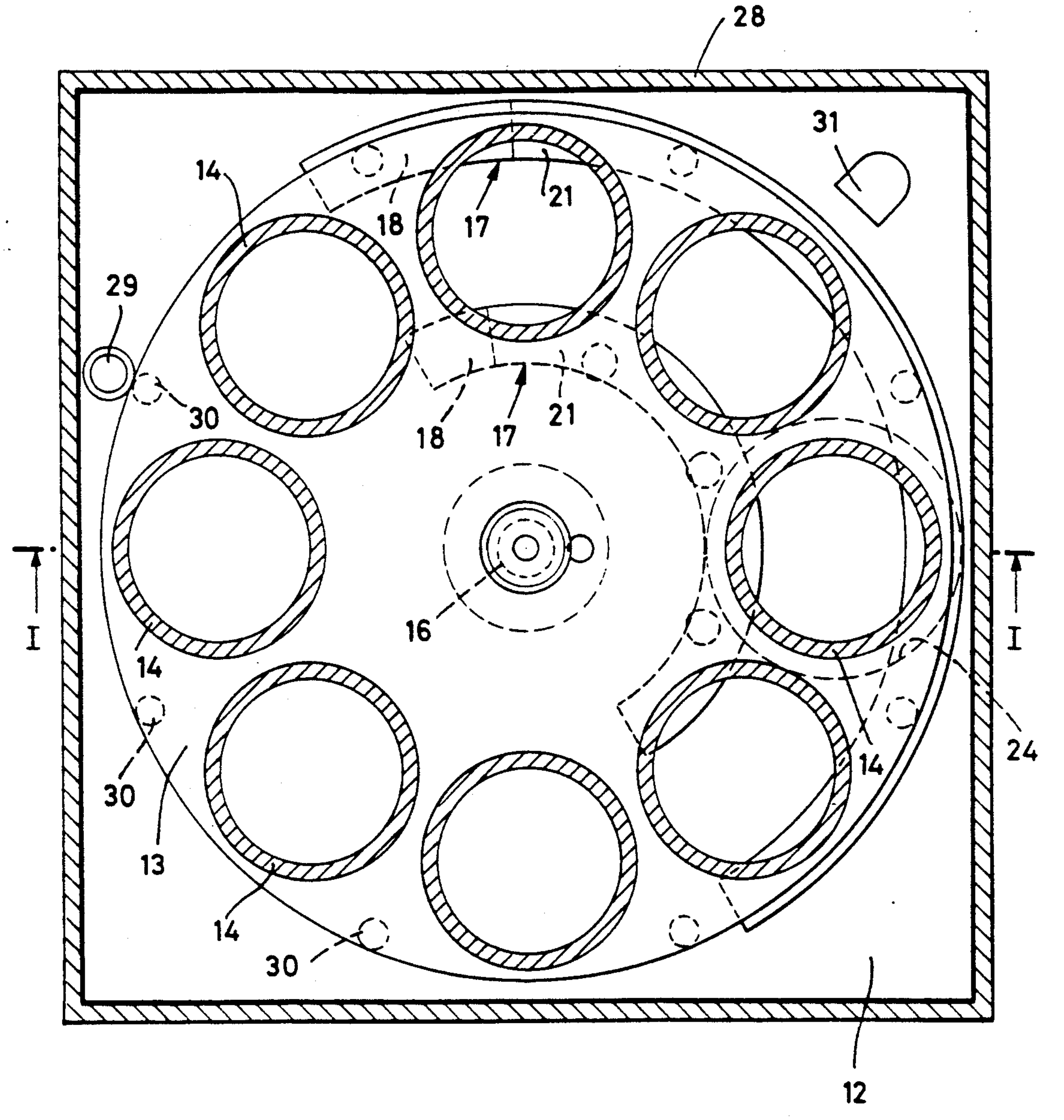
Figure 3:
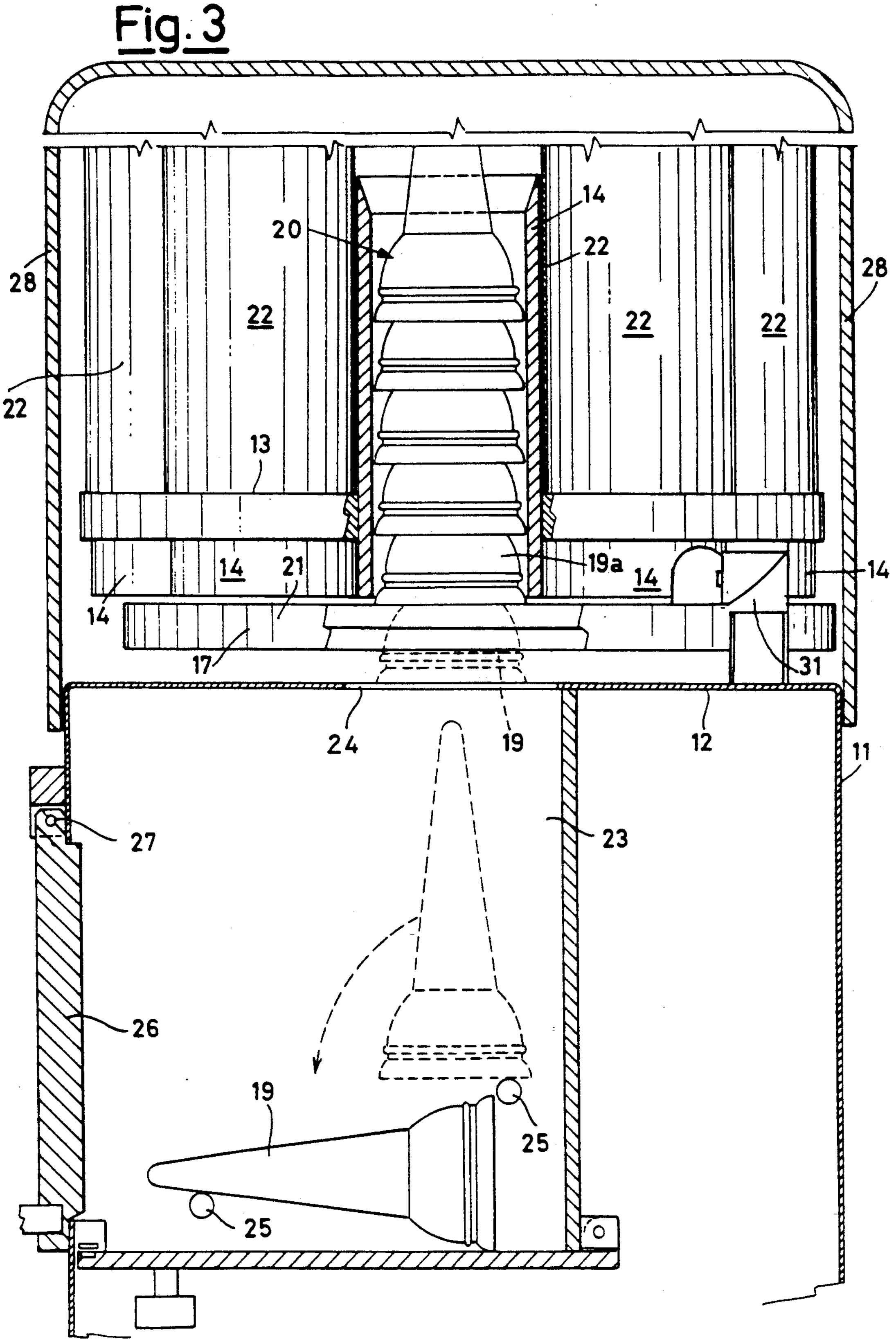

The structural and functional characteristics of the invention, as well as its advantages over the prior art will be better understood from the following disclosure, referred to the hereto attached schematic drawings, which show an exemplifying form of apparatus embodying the principles of the same invention. In the drawings:

FIG. 1 shows a vertical, sectional view illustrating the apparatus according to the present invention, taken according to the section plane represented by the path I—I of FIG. 2;

FIG. 2 shows a sectional view taken according to the section plane represented by the path II—II of FIG. 1; and FIG. 3 shows a sectional view of a detail showing the region of cone falling and drawing. Referring to the drawings, the apparatus according to the present invention is generally indicated by the reference numeral 10. The apparatus is structurally formed by a box-like base 11 with a top plane 12 on which a carrousel 13 is installed with possibility of stepwise rotation. At a suitable distance from the top plane; along its circumference, the carrousel 13 is provided with cylindrical housings 14 used in order to keep the cones 19 duly trued.

The stepwise rotation of the carrousel 13 is driven by ratio motor 15 which is housed inside the base 11, and is equipped with an output shaft 16 on which the carrousel 13 is keyed.

Between the plane 12 and the carrousel 13 a pair of mutually parallel, circular guides 17 are installed. The circular guides are provided with inclined planes 18 at their inlet end, i.e., their end at which the entry takes place of the first cone 19 of the cone stacks 20, and with horizontal, flat surfaces 21 by which the cones stacks 20 are supported, and on which the cone stacks slide.

The stacks 20 of the cones 19 stuck inside each other are housed inside container tubes 22 of the traditional type, which are slid on the cone-trueing cylindrical housing 14, with the container tubes coming to rest on the carrousel 13.

Inside the base 11 (see FIG. 3), a cone 19 dispensing station is organized, which comprises a housing 23 into which the cones 19 fall by gravity through an opening 24 provided through the top plane 12. The cones, brought to a horizontal position by means of positioning pins 25, are drawn by the user through a front door 26 hinged in 27.

A removable, external shell 28, e.g., made from polycarbonate, is provided with an opening (not shown in the figures) by means of which the tubes 22 are charged. The shell 28 seals on the apparatus by resting onto the base 11. This can be constituted by the same coin or token-operated unit used in order to control the dispenser. Of course, also an outer shell consisting of one single piece can be provided.

The operating way of the cone dispenser provided by the present invention is evident from the above disclosure made by referring to the hereto attached drawings and, briefly, is as follows.

The tubes 22 filled with cones 19 are charged to the machine by moving each trueing housing 14 in correspondence of the inlet opening provided through the shell 28, by causing the carrousel 13 to advance stepwise (in the herein depicted example, by ⅛-th of a revolution at a time) by means of a suitable control acting on the ratio motor 15. When the eight container tubes 22 are all charged, the dispenser is ready to operate in an automatic mode.

From now one, at each single-step rotation of the carrousel 13, one cone 19 will fall into the dispensing station 23, by gravity through the opening 24.

In fact, as one can clearly see from the drawings, the first cone 19 of each cone stack 20 is delicately separated, and under gradual extraction conditions, from the overhanging cone stack 20 due to the action of the inclined planes 18 of the guides 17. The guides 17 enter the region between the first cone 19 and the peripheral edge of the second cone 19*a*. As a consequence, when the carrousel 13 is caused to rotate, the first cone 19 will slide along the resting/sliding plane 12, while the second cone 19*a* and the whole cone stack above it will slide along the surfaces 21 of the guides 17. In such a way, when a cone 19 will find the opening 24, the cone 19 will freely fall down into the interior of the underlying dispensing station 23.

Of course, the operation of the apparatus according to the instant invention shall be governed by a purposely provided electrical system (as, e.g., energized by means of a pushbutton control means or a coin- or token-operated unit, which can also govern the operation of the ice cream machine), not depicted in the figures, in that it is within the reach of anyone skilled in the art. It is enough to say herein that by means of the electrical system first sensor means suitable for controlling the stepwise rotation of the carrousel 13, and second sensor means suitable for detecting the presence of the cones 19 can cooperate.

The first sensor means can be constituted by a magnetic sensor 29 installed on the plane 12, which magnetic sensor 29 cooperates with permanent magnets 30 provided on the carrousel 13, and the second sensor means can be constituted by a photo-cell 31.

By means of the foregoing, the purpose is achieved which is specified in the preamble to the disclosure, aiming at providing a cone dispenser of very simple and cheap general structure, which is easy to be cleaned and serviced, and which is also aesthetically valid, when is coupled with an ice cream machine.

I claim:

1. An apparatus for automatically dispensing cones and the like comprising:

a carrousel revolvably supported on a base having a upper plane, said carrousel having a plurality of tubes mounted thereon, each one of said tubes containing a plurality of the cones, in upside-down position and stuck inside each other whereby a plurality of cone stacks are formed, each tube carrying a stack of cones resting and sliding on said upper plane;

motor means for sequentially revolving said carrousel so as to sequentially position each tube at a dispensing station in said base;

gripping means for sequentially separating a first cone from the stacks of cones within said tubes, said gripping means comprising a pair of stationary circular guides positioned between said carrousel and said upper plane, said pair of stationary circular guides each having an inlet end provided with a respective inclined plane acting on a peripheral edge of a second cone of each cone stack to sequentially separate the first cone from each cone stack as the carrousel is revolved, and said stationary circular guides support the cone stacks while the first cone rests on the upper plane of said base until it falls by gravity through an opening in said upper plane at the dispensing station due to the sequential revolving of said carrousel.

2. Apparatus according to claim 1, wherein said carrousel (13) is provided along its circumference with a plurality of cylindrical housings (14) into which said tubes (22) are slid.

3. Apparatus according to claim 1, wherein inside said dispensing station (23) pins (25) are provided to contact cones falling therein and to orientate the fallen cones for removal from the dispensing station by a user.

4. Apparatus according to claim 1, wherein said apparatus further comprises a first sensor means (29, 30) for sensing and governing the stepwise rotation of the carrousel (13).

5. Apparatus according to claim 1, wherein said apparatus further comprises a second means for detecting the presence of the cones inside the container tubes (22).

* * * * *